United States Patent
Montenegro et al.

(10) Patent No.: US 12,436,186 B2
(45) Date of Patent: Oct. 7, 2025

(54) SELF-RESET TESTING SYSTEMS AND METHODS

(71) Applicant: ADVANTEST CORPORATION, Tokyo (JP)

(72) Inventors: Camilo Montenegro, San Jose, CA (US); Mei-Mei Su, San Jose, CA (US); Linden Hsu, San Jose, CA (US)

(73) Assignee: ADVANTEST CORPORATION, Tokyo (JP)

( * ) Notice: Subject to any disclaimer, the term of this patent is extended or adjusted under 35 U.S.C. 154(b) by 166 days.

(21) Appl. No.: 18/129,490

(22) Filed: Mar. 31, 2023

(65) Prior Publication Data

US 2024/0201251 A1 Jun. 20, 2024

Related U.S. Application Data

(60) Provisional application No. 63/439,430, filed on Jan. 17, 2023, provisional application No. 63/434,024, filed on Dec. 20, 2022.

(51) Int. Cl.
*G01R 31/28* (2006.01)
*G01R 31/317* (2006.01)
*G01R 31/319* (2006.01)

(52) U.S. Cl.
CPC ... *G01R 31/2889* (2013.01); *G01R 31/31727* (2013.01); *G01R 31/31907* (2013.01)

(58) Field of Classification Search
CPC .... G01R 31/00; G01R 31/28; G01R 31/2889; G01R 31/317; G01R 31/31727; G01R 31/3181; G01R 31/3183; G01R 31/318307; G01R 31/318342; G01R 31/318357; G01R 31/3185; G01R 31/318516; G01R 31/318519; G01R 31/319; G01R 31/31903; G01R 31/31907
USPC .................. 324/500, 537, 756.01
See application file for complete search history.

(56) References Cited

U.S. PATENT DOCUMENTS

| | | | |
|---|---|---|---|
| 11,430,536 B2 * | 8/2022 | Malisic | G11C 29/56 |
| 2016/0327609 A1 * | 11/2016 | Larzul | G01R 31/31703 |
| 2020/0285534 A1 | 9/2020 | Chaiken et al. | |
| 2021/0117298 A1 * | 4/2021 | Su | G01R 31/31724 |

FOREIGN PATENT DOCUMENTS

| | | | | |
|---|---|---|---|---|
| CN | 107632910 B | * | 10/2020 | G06F 11/22 |
| CN | 112346915 A | | 2/2021 | |
| TW | 202225957 A | | 7/2022 | |

* cited by examiner

Primary Examiner — Hoai-An D. Nguyen

(57) ABSTRACT

Efficient and effective testing systems and methods are presented. In one embodiment, a test system includes: a system comprising a test board configured to communicatively couple with a plurality of devices under test (DUTs), wherein the test board includes a functional/interface application specific integrated circuit (ASIC) component, and the test board includes a component configured to generate a simulated indication that a resource from a source external to the functional/interface ASIC is stable, and a tester configured to direct testing of the plurality of DUTs, wherein the tester is communicatively coupled to the functional/interface ASIC. In one embodiment the ASIC is a field programmable gate array (FPGA).

19 Claims, 7 Drawing Sheets

200

---

210
Receiving an indication that a FPGA is communicatively coupled to a communication bus in a test system, wherein the FPGA is configured to interface with a device under test (DUT).

220
Providing a resource to the FPGA from an external source, including a simulated indication that the supplied resource from the external source is stable.

FIG. 2

SELF-RESET TESTING SYSTEMS AND METHODS

RELATED APPLICATIONS

This application claims the benefit of and priority to the following provisional applications:
- 63/434,024 entitled SELF RESET TESTING SYSTEMS AND METHODS filed on Dec. 20, 2022, and
- 63/439,430 entitled SELF RESET TESTING SYSTEMS AND METHODS filed on Jan. 17, 2023, which are incorporated herein by reference.

FIELD OF INVENTION

Field

Systems and methods configured to provide testing capability for devices under test (DUTs) including testing of reset operations.

Background

Electrical and electronic systems and devices provide significant advantageous benefits in numerous areas. Testing the systems and devices is important for ensuring dependable operation and accurate results. Proper initialization and resetting of device operations are usually very important for achieving reliable performance. However, traditional test system initialization and reset activities can be inefficient and problematic. In particular, efficiently performing test operations in environments that use a signal to indicate stable initial and reset conditions can be difficult in conventional test system approaches. For example, a device (e.g., FPGA, DUT, SSD, etc.) communicatively coupled to a PCIE compatible bus typically relies on an externally generated PERST signal to indicate the power from an external power source has been reset and is stable (e.g., allowing a device to proceed with reset initialization, etc.). Conventional test system CPUs/hosts do not typically power down during testing (e.g., the tester power source does not turn off, etc.) and thus a PERST signal is not provided to downstream components (e.g., a test system FPGA, etc.). Traditionally, to initialize or reset a test system component (such as a FPGA, etc.) the test system CPU/host usually has to be turned off and on. Usually, all or most of the testing operations in the conventional system are interrupted and often cancelled. Even if the testing operations can be restarted, the interruption can result in detrimental impacts on an overall test system basis (e.g., waste of time, consumption of energy, etc.). Thus, initialization and reset features of the downstream components cannot be tested properly/conveniently in the prior art. Typically, there was no efficient solution in the prior art when an external reset signal (e.g., PERST, etc.) is not conveniently available.

SUMMARY

Efficient and effective testing systems and methods are presented. In one embodiment, a test system includes: a system comprising a test board configured to communicatively couple with a plurality of devices under test (DUTs), wherein the test board includes a functional/interface application specific integrated circuit (ASIC) component, and the test board includes a component configured to generate a simulated indication that a resource from a source external to the functional/interface ASIC is stable, and a tester configured to direct testing of the plurality of DUTs, wherein the tester is communicatively coupled to the functional/interface ASIC. In one embodiment the ASIC is a field programmable gate array (FPGA).

In one embodiment, a system includes a test board and a tester. The test board is configured to communicatively couple with a plurality of devices under test (DUTs), wherein the test board includes a FPGA. The tester is configured to direct testing of the plurality of DUTs, wherein a host in the tester is communicatively coupled to the FPGA and the test board includes logic to internally generate a simulated reset stable indication for the FPGA. In one embodiment, the simulated reset stable indication for the FPGA simulates an externally generated reset stable signal that otherwise comes from the host. The simulated reset stable indication can be generated in association with an FPGA linking up to the communication port (e.g., COM, etc.) in a test system. In one embodiment, the host and FPGA are communicatively coupled by a PCIe compatible bus and the simulated reset indication is generated based upon an amount of time after the FPGA is communicatively coupled to a PCIe bus and initially receives power. The host and FPGA can be communicatively coupled by a PCIe compatible bus and the simulated reset stable indication can be an indication to the FPGA that an externally supplied resource as part of a reset is stable. In one exemplary implementation, power for the FPGA is supplied from an external source and the simulated reset stable indication is associated with power supplied from the external source. The simulated reset stable indication can simulate a PERST signal. A simulated reset stable indication does not necessarily correspond to an actual reset of the power source.

In one embodiment, a method includes receiving an indication that a FPGA is communicatively coupled to a communication bus in a test system, wherein the FPGA is configured to interface with a device under test (DUT) and provide a resource to the FPGA from an external source, including a simulated indication that the supplied resource from the external source is stable.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings may not be drawn to scale.

FIG. 2 is a flow chart of an exemplary method 200 in accordance with one embodiment.

DETAILED DESCRIPTION

Figure 1:
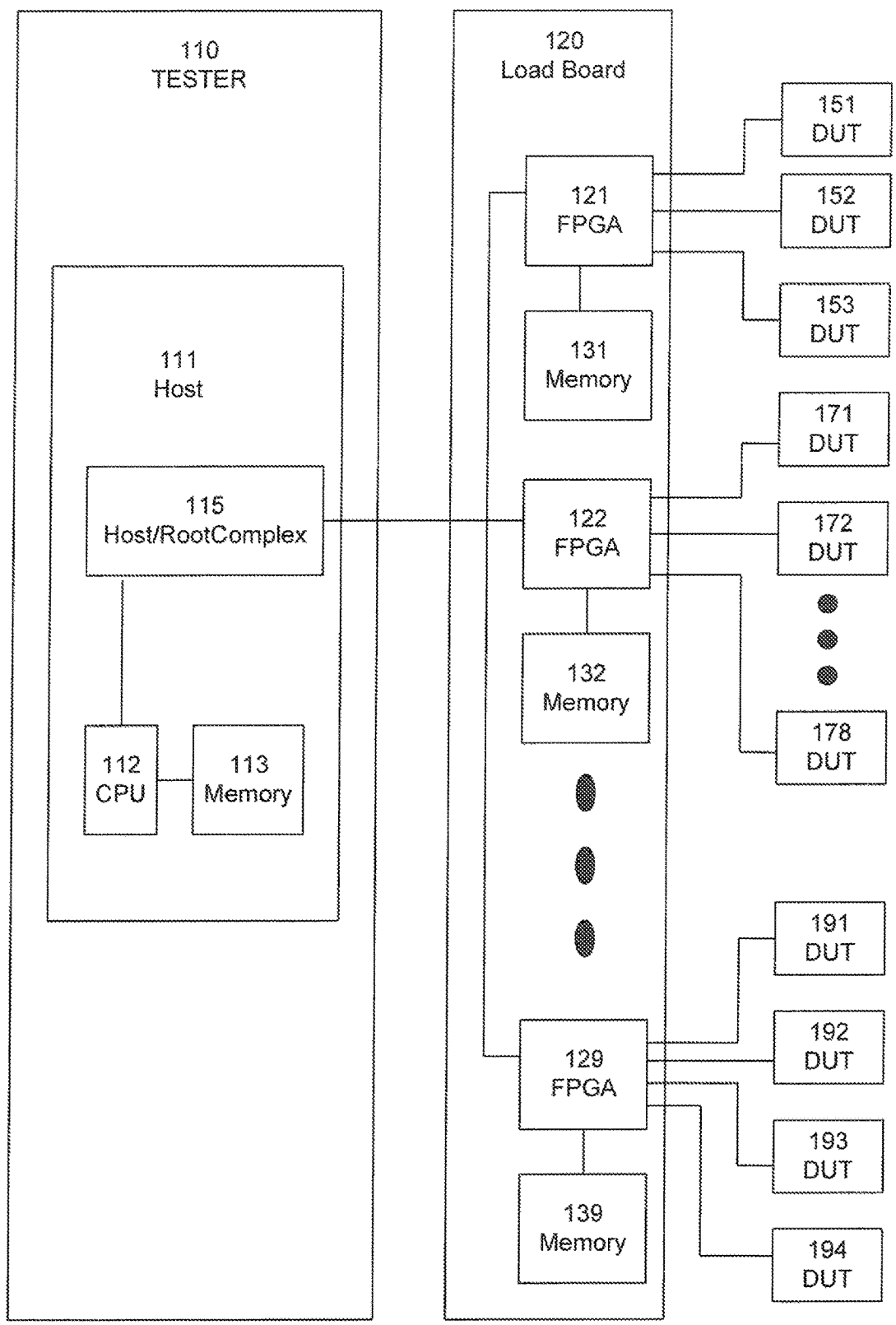
FIG. 1 is a block diagram on an exemplary test system with a PCIe bus scheme communicatively coupling a host/root complex with FPGAs in accordance with one embodiment.

Reference will now be made to various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The accompanying drawings, which are incorporated in and form a part of this specification, are included for exemplary illustration of the principles of the present invention and are not intended to limit the present invention to the particular implementations illustrated therein.

The figures are not necessarily drawn to scale (unless otherwise specifically indicated), and only portions of the devices and structures depicted, as well as the various layers that form those structures, are shown. For simplicity of discussion and illustration, only one or two devices or structures may be described, although in actuality more than one or two devices or structures may be present or formed. Also, while certain elements, components, and layers are discussed, embodiments according to the invention are not limited to those elements, components, and layers. For example, there may be other elements, components, layers, and the like in addition to those discussed.

Presented systems and methods provide efficient and effective reset capability for testing system operations. In one embodiment, systems and methods are directed to providing convenient (e.g., plug and play, etc.) reset test capabilities for test systems with components that utilize an external power source and rely upon an external reset conditions stable indication/signal. In one embodiment, a simulated reset indication of stable reset conditions is provided to a test system component. In one exemplary implementation, rather than receiving an external stable reset condition indication from the power source associated with the reset, a simulated reset indication is generated internally and relied upon to indicate stable reset conditions. The simulated reset indication can be provided when an external reset related indication/signal (e.g., PERST, etc.) for a test system component is not otherwise available or missing. In one exemplary implementation, the simulated reset indication is a signal (e.g., a simulation reset signal, etc.) that simulates an external power reset related signal (e.g., PERST, etc.) for a test system component.

In one embodiment, a simulated reset stable indication (e.g., simulating a PERST signal, etc.) is supplied to a FPGA component in the test system. In one exemplary implementation, a simulated reset stable indication is generated in association with an FPGA linking up to the COM in a test system. The simulated reset stable indication can be generated by various components/logic. The simulated reset stable indication can be generated by logic within the FPGA (e.g., the FPGA has a self-reset capability that includes internally generating and providing the reset simulation signal, etc.). The simulated reset stable indication can be generated by logic within a component external to the FPGA, wherein the component is other than a tester host (e.g., tester CPU, etc.) that normally generates an external reset control signal (e.g., PERST, etc.). In either scenario, the power source in the tester does not necessarily have to be powered down (e.g., a simulated reset stable indication does not necessarily correspond to an actual reset, shut down, and so on of the power source, etc.).

In one embodiment, a test component (e.g., FPGA, etc.) is communicatively coupled to a test system host via a Peripheral Component Interconnect Express (PCIe) compatible bus scheme. FIG. 1 is a block diagram on an example test system 100 with a PCIe bus scheme communicatively coupling a host/root complex with FPGAs in accordance with one embodiment. Test system 100 includes tester 110 communicatively coupled to load board 120 which is communicatively coupled to DUTs (e.g., 151, 152, 153, 171, 172, 179, 191, 192, 193, 194, etc.). Tester 110 includes host 111 which includes host/root complex 115 communicatively coupled to central processing unit (CPU) 112, which is communicatively coupled to memory 113. Load board 120 includes FPGA 121 communicatively coupled to memory 131, FPGA 122 communicatively coupled to memory 132, and FPGA 129 communicatively coupled to memory 139.

In one embodiment, a system includes self-reset capabilities. In one exemplary implementation, a system and method simulates a reset stable indication. The simulated reset stable indication can be an indication to an end point (EP) component/device communicatively coupled to the PCIe bus that a host/root complex of the PCIe bus provided resources (e.g., power, clock, etc.) are in a stable condition (e.g., simulate a PERST signal, etc.). In one embodiment, a simulated reset stable indication can also indicate that an end point (EP) can start initialization on the test component/device (e.g., FPGA, etc.) for PCIe link up. Test system operations can generate a simulated reset stable signal to indicate that power from an external power source is stable.

In one embodiment, a simulated reset indication is generated based upon an amount of time after a test component (e.g., FPGA, etc.) is communicatively coupled to a PCIe bus and initially receives power. The amount of time can be similar to an average time a test system otherwise takes to supply power in a stable condition (e.g., stable voltage, etc.). In one exemplary implementation, the amount of time is based on the time a host takes to get to PCIE enumeration.

In one embodiment, the FPGA is an end point (EP) and a host included in the test system is a root complex communicatively coupled to a peripheral component interconnect express (PCIe) bus, wherein the simulated reset stable indication is an indication to the FPGA that a resource provided by the host is in a stable condition. The simulated indication can trigger the FPGA to start an initialization process for a communication bus link.

FIG. 2 is a flow chart of an exemplary method 200 in accordance with one embodiment. In one exemplary implementation, method 200 is a self-reset process. In one embodiment, a self-reset process enables a component to proceed as if an external resource supply is reset without the external resource supply necessarily actually being reset.

In block 210, an indication that a FPGA is communicatively coupled to a communication bus (e.g., in a test system, etc.) is received. In one embodiment, the FPGA is configured to interface with a device under test (DUT).

In block 220, a resource is provided to the FPGA from an external source, including a simulated indication that the supplied resource from the external source is stable. In one embodiment, providing the simulated indication is part of a reset process. In one exemplary implementation, the reset process includes a simulation of a reset of the external power source.

In one embodiment, there is a "guardrail" for issues where sometimes the test component and host link up and then the link goes away. In one exemplary implementation, there is signal from the PCI link core and the logic monitors that to determine if the signal goes down or other indication there was a problem on that signal/link, in which case the simulated reset indication is set again (e.g., set back low, etc.) and the timer is restarted. When the timer expires, another simulated reset indication is generated again.

Figure 3:
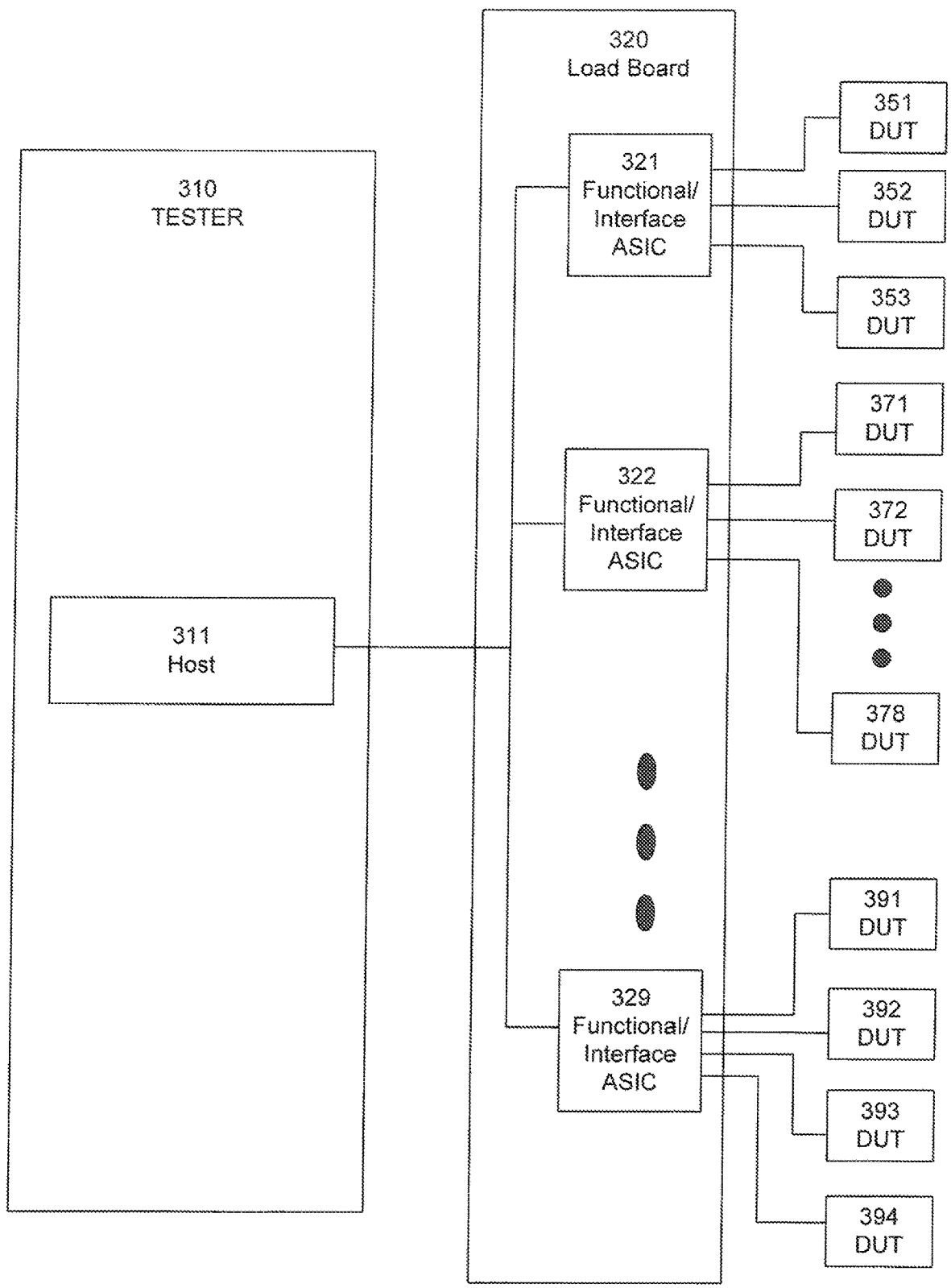
FIG. 3 is a block diagram on an example test system 300 with a PCIe bus scheme communicatively coupling a host/root complex with FPGAs in accordance with one embodiment.

FIG. 3 is a block diagram on an example test system 300 with a PCIe bus scheme communicatively coupling a host/root complex with FPGAs in accordance with one embodiment. Test system 300 includes tester 310 communicatively coupled to load board 320 which is communicatively coupled to DUTs (e.g., 351, 352, 353, 371, 372, 379, 391, 392, 393, 394, etc.). Tester 310 includes host 311 which includes host 311 communicatively coupled load board 320. Load board 320 includes functional/interface component 321, functional/interface component 322, and functional/interface component 329. In one embodiment, a functional/interface component (e.g., ASIC, FPGS, etc.) is configured to provide functional and interfacing support for testing related activities between the test system and DUTs.

In one embodiment, the test board is configured to communicatively couple with a plurality of devices under test (DUTs), wherein the test board includes a functional/interface application specific integrated circuit (ASIC) component, and the test board includes a component configured to generate a simulated indication that a resource from a source external to the functional/interface ASIC is stable. The tester is configured to direct testing of the plurality of DUTs, wherein the tester is communicatively coupled to the functional/interface ASIC. The resource can include power from a power supply that is external the functional/interface ASIC. The resource can include a clock signal from a clock supply that is external the functional/interface ASIC. In one exemplary implementation, the simulated indication indicates that the functional/interface ASIC is able to start an initialization process. The initialization process can be associated with a communication link. The simulated indication can be associated with reset activities.

Figure 4:
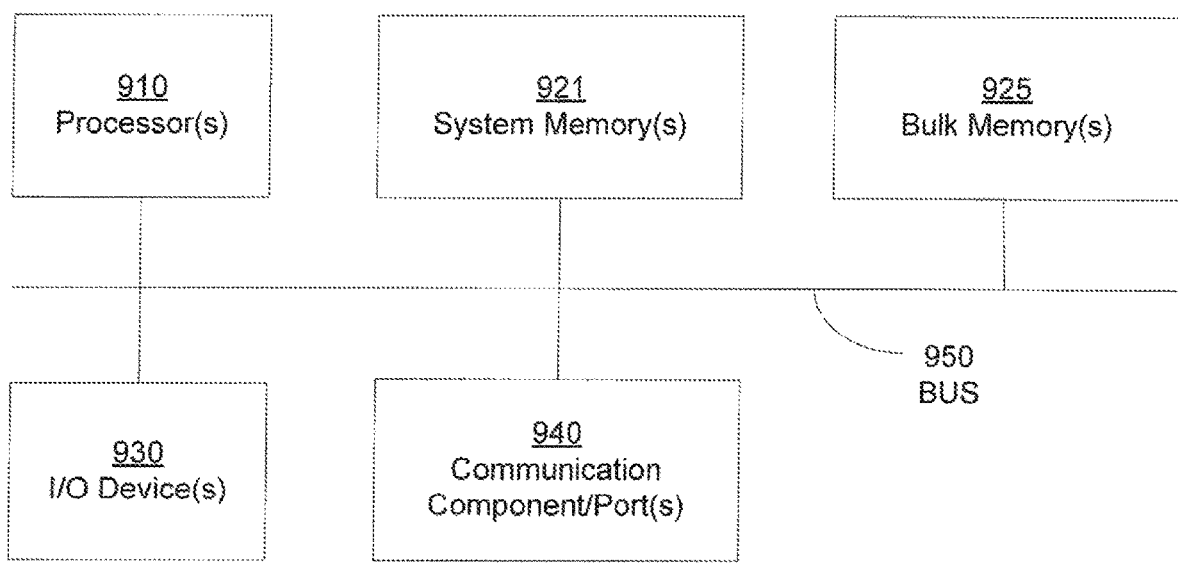
FIG. 4 is a block diagram of an exemplary electronic system which may be used as a platform to implement and control an exchange process in accordance with one embodiment.

FIG. 4 is a block diagram of an exemplary electronic system 900 which may be used as a platform to implement and control an exchange process in accordance with one embodiment. Electronic system 900 can be a "server" computer system. Electronic system 900 includes a central processor(s) 910, system memory 915, bulk memory 925, input/output (I/O) devices 930, communication component/port 940, and bus 950. Bus 950 is configured to communicatively couple and communicate information between the other components (e.g., central processor(s) 910, system memory 915, bulk memory 925, input/output (I/O) devices 930, communication component/port 940, etc.). Central processor(s) 910 is configured to process information and instructions. System memory 921 (e.g., reads only memory (ROM), random access memory (RAM), etc.) and bulk memory(s) 925 is configured to store information and instructions for the central processor complex 915. I/O device(s) 930 can communicate information to the system (e.g., central processor 910, memory 925, etc.). I/O devices 930 may be any suitable device for communicating information and/or commands to the electronic system (e.g., a keyboard, buttons, a joystick, a track ball, an audio transducer, a microphone, a touch sensitive digitizer panel, eyeball scanner, display component, light emitting diode (LED) display, plasma display device etc.). Communication port 940 is configured to exchange/communicate information with external devices/network (not shown). A communication port 940 can have various configurations (e.g., limitation RS-232 ports, universal asynchronous receiver transmitters (UARTs), USB ports, infrared light transceivers, ethernet ports, IEEE 13394, synchronous ports, etc.) and can communicate with an external network.

Figure 5:
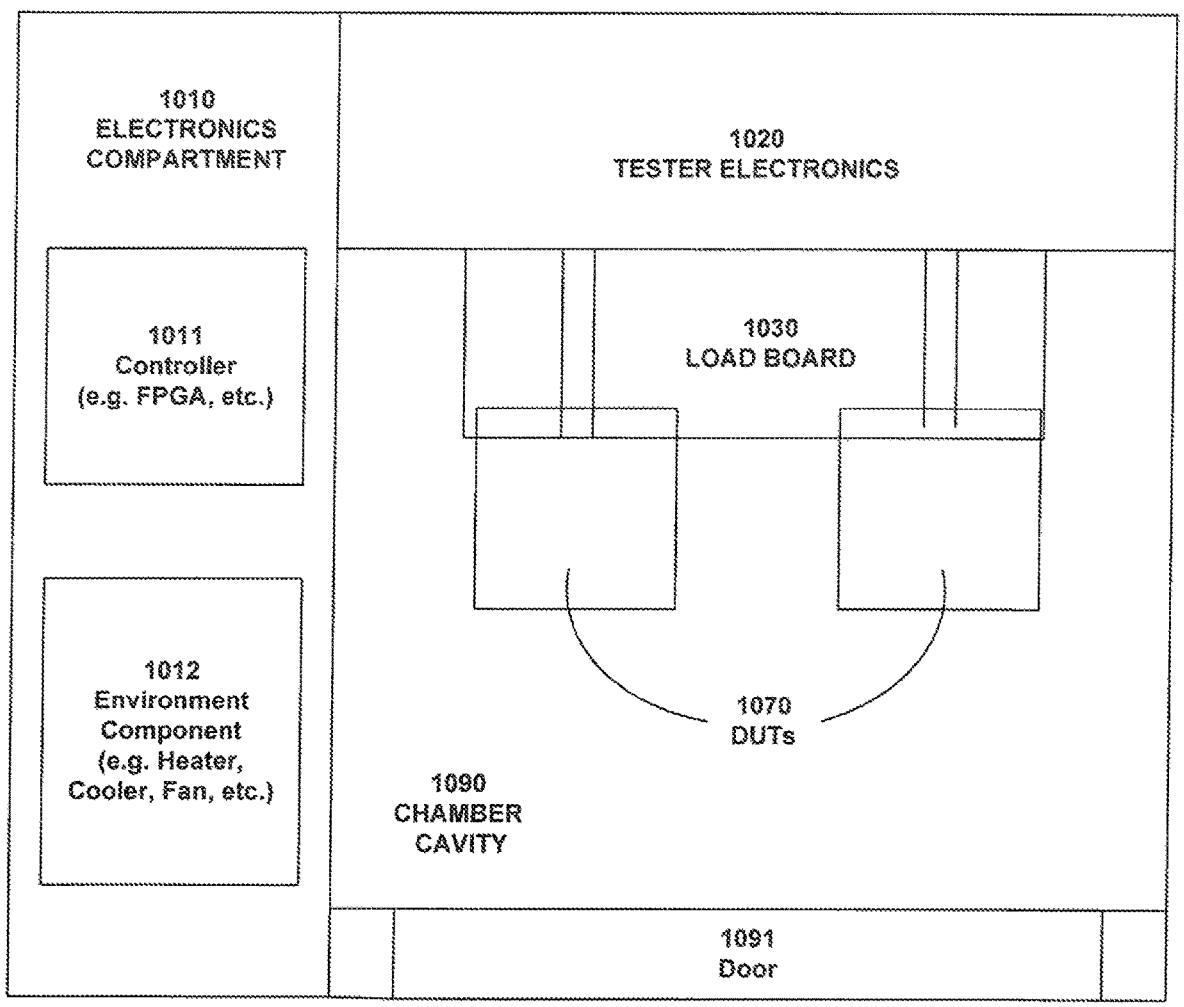
FIG. 5 is a block diagram of an exemplary testing system in accordance with one embodiment.

FIG. 5 is a block diagram of an exemplary testing system 1000 in accordance with one embodiment. Testing system 1000 includes electronics compartment 1010 and tester electronics 1020, loadboard 1030, DUTs 1070, and testing chamber 1090 with door 1091. Electronics compartment 1010 includes controller 1011 and environment component 1012. Enhanced loopback components can be inserted instead of the DUTs for diagnostic analysis (e.g., of tester electronics 1020, etc.).

Figure 6:
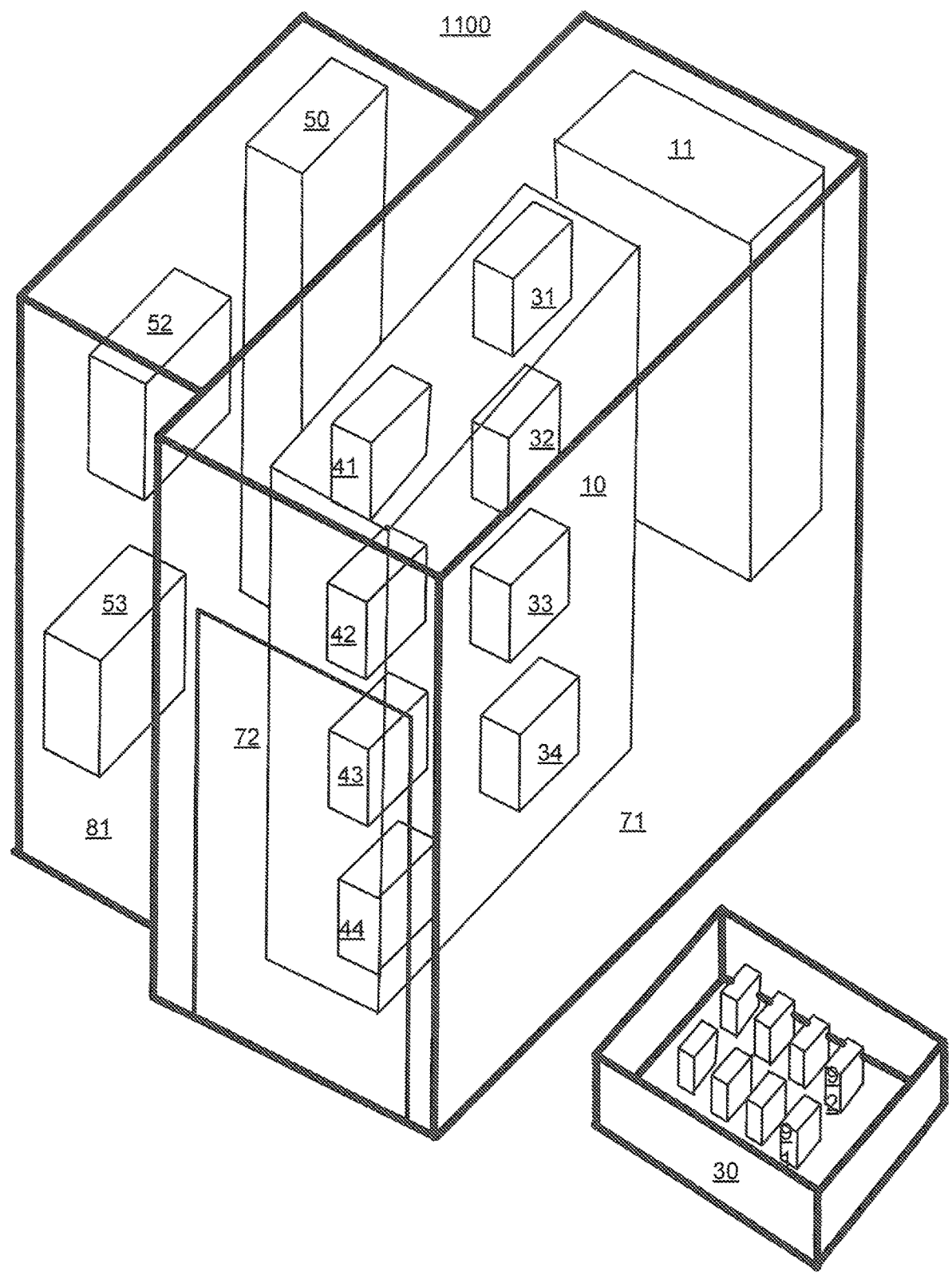
FIG. 6 is a block diagram of an exemplary testing system in accordance with one embodiment.

FIG. 6 is a block diagram of an exemplary testing system 1100 in accordance with one embodiment. It consists of a large controlled environmental chamber or oven 71 that contains an oven rack 10 and heating and cooling elements 11. The oven rack 10 contains devices under test (DUTs) in a number of loadboard trays 31, 32, 33, 34, 41, 42, 43, and 44. The environmental test chamber 71 has solid walls and a solid door 72 that enclose the test rack 15. The heating and cooling elements 11 can have a wide temperature range (e.g., −10 to 120 degrees C.). The tester or test head 81 contains various racked components, including system controller network switches 52, system power supply components 53, and tester slices 50 (the tester slice contains the tester electronics). The loadboard trays (e.g., 30, 31, etc.) are connected to tester slices 50 (multiple loadboard trays can be coupled to a single tester slice). There is also a block diagram of a tester tray 30 and devices under test (e.g., 91, 92, etc.). The loadboard trays are manually populated with devices under test. The full tester trays (e.g., 30, 31, etc.) are manually inserted into environmental chamber 71 and manually connected to the tester electronics (e.g., 50, 52, 53, etc.). This process can be labor intensive and cumbersome (e.g., the process requires opening the door 72 of the environmental chamber 71 and manually trying to insert the trays though the door 72 into the appropriate location). Enhanced loopback components can be inserted instead of the DUTs for diagnostic analysis of tester electronics.

In one embodiment, a test system includes a device interface board and tester electronics that control testing operations. The tester electronics can be located in an enclosure which together are referred to as the primitive. The device interface board has a device under test access interface that allows physical manipulation of the devices under test (e.g., manual manipulation, robotic manipulation, etc.). A device under test can be independently manipulated physically with little or no interference or impacts on testing operations of another device under test. Device interface boards and their loadboards can be conveniently setup to accommodate different device form factors. In one embodiment, loadboards are configured with device under test interfaces and universal primitive interfaces. In one exemplary implementation, the device interface board can control an ambient environment of a device under test.

Figure 7:
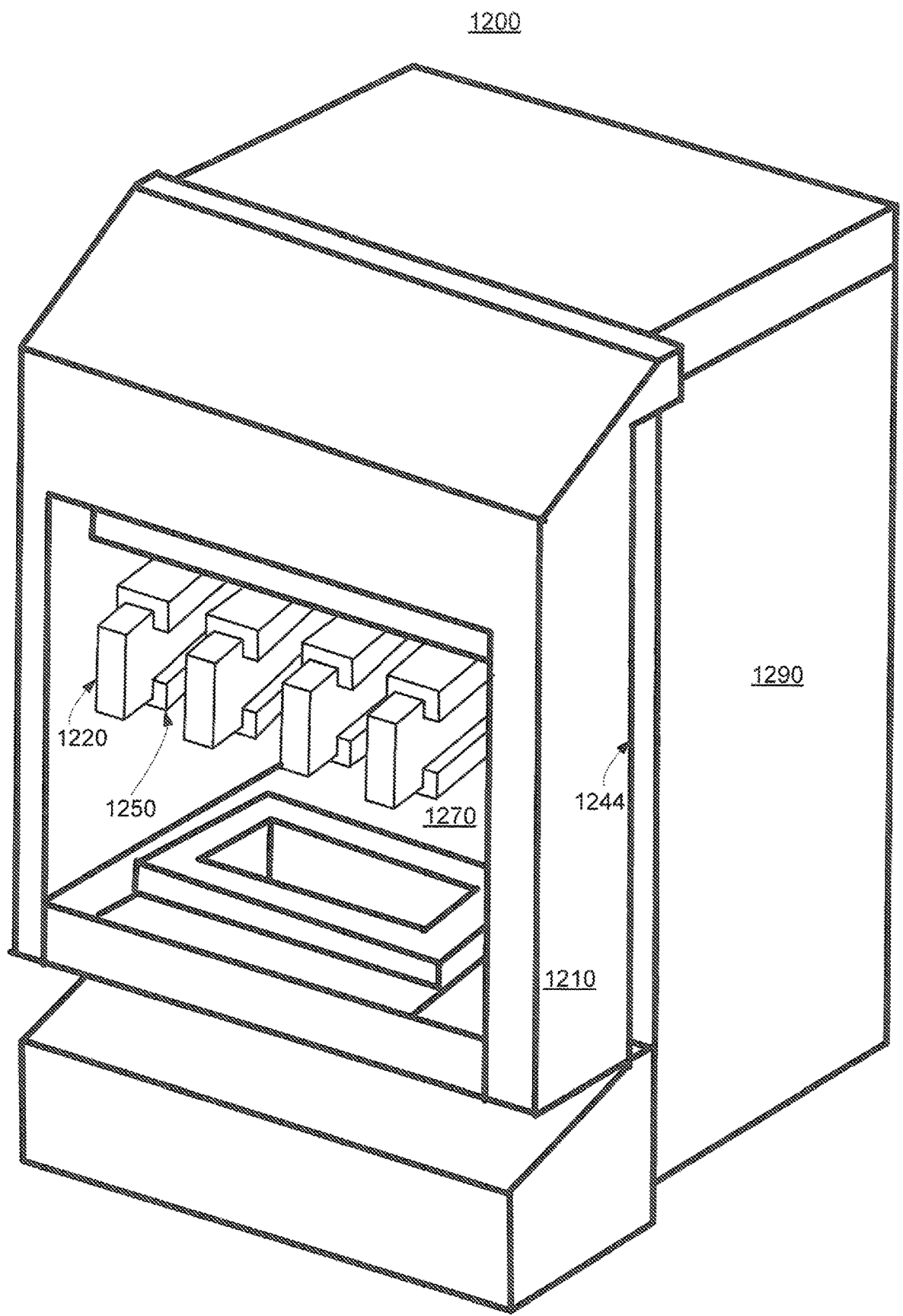
FIG. 7 is a block diagram of an exemplary test system in accordance with one embodiment.

FIG. 7 is a block diagram of an exemplary test system 1200 in accordance with one embodiment. Test system 1200 includes a testing primitive 1290 (e.g., containing the testing control hardware and power supply components for the devices under test, etc.) and a device interface board (DIB) 1210 disposed in front of and coupled to the primitive 1290. In one embodiment, the device interface board 1210 is a partial enclosure. The loadboard is also coupled to and electrically interfaces with the primitive 1290 to obtain power and high-speed electrical signals for testing the device under test 1220. The device interface board can include air flow channels 1244 that allow air flow to and from the device under test environment. The air flow channels 1244 can include baffles. The device interface board 1210 partial enclosure includes a device under test access interface 1270 that enables easy physical access (e.g., unobstructed, unimpeded, etc.) to the devices under test. Environmental control components 1211 and 1214 control and maintain device under test ambient environmental conditions (e.g., temperature, air flow rate, etc.). The environmental control components can create an environmental envelope that prevents or mitigate interference from outside environmental conditions on the operations of devices under test. In one embodiment, access to test system 1200 may be easier than test system 1100. Enhanced loopback components can be inserted instead of the DUTs for diagnostic analysis of tester electronics (e.g., in primitive 1290, etc.).

While the invention has been described in conjunction with the preferred embodiments, it will be understood that they are not intended to limit the invention to these embodiments. On the contrary, the invention is intended to cover alternatives, modifications, and equivalents. The description is not intended to be exhaustive or to limit the invention to the precise forms disclosed, and obviously many modifications and variations are possible.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

It is appreciated that embodiments of the present invention can be compatible and implemented with a variety of different types of tangible memory or storage (e.g., RAM, DRAM, flash, hard drive, CD, DVD, etc.). The memory or storage, while able to be changed or rewritten, can be considered a non-transitory storage medium. By indicating a non-transitory storage medium it is not intend to limit characteristics of the medium, and can include a variety of storage mediums (e.g., programmable, erasable, nonprogrammable, read/write, read only, etc.) and "non-transitory" computer-readable media comprises all computer-readable media, with the sole exception being a transitory, propagating signal.

It is appreciated that the description includes exemplary concepts or embodiments associated with the novel approach. It is also appreciated that the listing is not exhaustive and does not necessarily include all possible implementation. The concepts and embodiments can be implemented in hardware, firmware, software, and so on. In one embodiment, the methods or process describe operations performed by various processing components or units. In one exemplary implementation, instructions, or directions associated with the methods, processes, operations, etc. can be stored in a memory and cause a processor to implement the operations, functions, actions, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the Claims.

The invention claimed is:

1. A system comprising:
   a test board configured to communicatively couple with a plurality of devices under test (DUTs), wherein the test board includes an FPGA; and
   a tester configured to direct testing of the plurality of DUTs, wherein a host in the tester is communicatively coupled to the FPGA, wherein the test board includes logic to internally generate a simulated reset stable indication for the FPGA, and wherein the simulated reset stable indication is an indication that an externally supplied resource is stable.

2. The system of claim 1, wherein the simulated reset stable indication for the FPGA simulates an externally generated reset stable signal that otherwise comes from the host.

3. The system of claim 1, wherein the simulated reset stable indication is generated in association with an FPGA linking up to a communication port (COM) in a test system.

4. The system of claim 1, wherein the host and FPGA are communicatively coupled by a PCIe compatible bus and wherein further the simulated reset indication is generated based upon an amount of time after the FPGA is communicatively coupled to a PCIe bus and initially receives power.

5. The system of claim 1, wherein the host and FPGA are communicatively coupled by a PCIe compatible bus and wherein further the simulated reset stable indication is an indication to the FPGA that an externally supplied resource as part of a reset is stable.

6. The system of claim 1, wherein power for the FPGA is supplied from an external source and wherein further the simulated reset stable indication is associated with power supplied from the external source.

7. The system of claim 1 wherein the simulated reset stable indication simulates a PERST signal.

8. The system of claim 1, wherein the simulated reset stable indication does not correspond to an actual reset of the externally supplied resource.

9. The system of claim 1, wherein a clock signal for the FPGA is supplied from an external source and wherein further the simulated reset stable indication is associated with the clock signal supplied from the external source.

10. A method comprising:
   receiving an indication that an FPGA is communicatively coupled to a communication bus in a test system, wherein the FPGA is configured to interface with a device under test (DUT); and
   providing a resource to the FPGA from an external source, wherein the resource comprises a simulated indication that the resource provided by the external source is stable.

11. The method of claim 10, wherein the providing the simulated indication is part of a reset process.

12. The method of claim 11, further comprising simulating a reset of the external source.

13. The method of claim 10, wherein the FPGA is an end point (EP) and wherein a host of the test system is a root complex communicatively coupled to a peripheral component interconnect express (PCIe) bus, and wherein further the simulated indication is an indication to the FPGA that a resource provided by the host is in a stable condition.

14. The method of claim 10, wherein the simulated indication triggers the FPGA to start an initialization process for a communication bus link.

15. A system comprising:
   a test board configured to communicatively couple with a plurality of devices under test (DUTs), wherein the test board includes a functional/interface application specific integrated circuit (ASIC) component, and wherein the test board includes a component configured to generate a simulated indication that a resource from a source external to the functional/interface ASIC is stable, wherein the resource comprises power from a power supply that is external to the functional/interface ASIC; and
   a tester configured to direct testing of the plurality of DUTs, wherein the tester is communicatively coupled to the functional/interface ASIC component.

16. The system of claim 15, wherein the simulated indication is associated with reset activities.

17. The system of claim 15, wherein the resource comprises a clock signal from a clock supply that is disposed external to the functional/interface ASIC component.

18. The system of claim 15, wherein the simulated indication indicates that the functional/interface ASIC component is able to start an initialization process.

19. The system of claim 18, wherein the initialization process is associated with a communication link.

* * * * *